(12) United States Patent
Twitchell

(10) Patent No.: US 7,650,135 B2
(45) Date of Patent: Jan. 19, 2010

(54) REMOTE SENSOR INTERFACE (RSI) STEPPED WAKE-UP SEQUENCE

(75) Inventor: Robert W. Twitchell, Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 505 days.

(21) Appl. No.: 11/422,321

(22) Filed: Jun. 5, 2006

(65) Prior Publication Data

US 2006/0276161 A1    Dec. 7, 2006

Related U.S. Application Data

(60) Provisional application No. 60/687,415, filed on Jun. 3, 2005, provisional application No. 60/691,884, filed on Jun. 17, 2005.

(51) Int. Cl.
*H04B 1/16* (2006.01)
(52) U.S. Cl. .................................. 455/343.3; 455/574
(58) Field of Classification Search ............... 455/41.2, 455/343.1, 343.2, 343.3, 343.4, 574
See application file for complete search history.

(56) References Cited

U.S. PATENT DOCUMENTS

| | | | |
|---|---|---|---|
| 4,613,990 A | 9/1986 | Halpern | |
| 4,680,583 A | 7/1987 | Grover | |
| 5,040,238 A | 8/1991 | Comroe et al. | |
| 5,054,052 A * | 10/1991 | Nonami | 455/574 |
| 5,117,501 A | 5/1992 | Childress et al. | |
| 5,129,096 A | 7/1992 | Burns | |
| 5,210,540 A | 5/1993 | Masumoto | |
| 5,265,025 A | 11/1993 | Hirata | |

(Continued)

FOREIGN PATENT DOCUMENTS

EP    0467036 A2    1/1992

(Continued)

OTHER PUBLICATIONS

Gary Morgan, Miniature Tags Provide Visibility & Cohesion for an LIA Battalion Level 'Proof of Principle', Pacific NW National Laboratory, Apr. 2001, Gary.morgan@pnl.gov.

(Continued)

*Primary Examiner*—Blane J Jackson
(74) *Attorney, Agent, or Firm*—Tillman Wright, PLLC; Chad D. Tillman; James D. Wright

(57) ABSTRACT

A transceiver includes a two-way communication component capable of powering down to conserve energy and capable of powering up in response to an electronic signal, the two-way communication component including a transmitter and a first receiver; and a second receiver that is configured to screen a radio frequency broadcast and provide the electronic signal to the two-way communication component in order to power up the two-way wireless communication component. The second receiver is configured to screen the radio frequency broadcast for first criteria, and screen the radio frequency broadcast for second criteria. The electric current may be an order of magnitude larger when screening for the first criteria than the second criteria. Screening also may be performed for third criteria, namely, specific data. The second receiver is adapted to draw substantially less current while awaiting receipt of and listening for a radio frequency broadcast than the two-way wireless communication component.

22 Claims, 8 Drawing Sheets

U.S. PATENT DOCUMENTS

| | | |
|---|---|---|
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A * | 2/1997 | Allen et al. ............... 340/10.31 |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A * | 8/1998 | Rotzoll .................... 455/343.1 |
| 5,793,882 A | 8/1998 | Piatek et al. |
| 5,833,910 A | 11/1998 | Teixido |
| 5,890,054 A | 3/1999 | Logsdon et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,473,607 B1 | 10/2002 | Shohara et al. |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,600,418 B2 | 7/2003 | Francis et al. |
| 6,611,556 B1 | 8/2003 | Koerner |
| 6,614,349 B1 | 9/2003 | Proctor et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,934,540 B2 | 8/2005 | Twitchell, Jr. |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,098,784 B2 | 8/2006 | Easley et al. |
| 7,103,344 B2 * | 9/2006 | Menard .................... 455/343.2 |
| 7,126,470 B2 | 10/2006 | Clift et al. |
| 7,133,704 B2 | 11/2006 | Twitchell |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,212,122 B2 | 5/2007 | Gloekler et al. |
| 7,221,668 B2 | 5/2007 | Twitchell, Jr. |
| 7,230,933 B2 | 6/2007 | Bahl et al. |
| 7,317,382 B2 | 1/2008 | Pratt |
| 7,348,875 B2 | 3/2008 | Hughes et al. |
| 7,440,781 B2 * | 10/2008 | Beach et al. ................ 455/574 |
| 2001/0000019 A1 | 3/2001 | Bowers et al. |
| 2002/0039896 A1 | 4/2002 | Brown |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0001743 A1 | 1/2003 | Menard |
| 2003/0008692 A1 * | 1/2003 | Phelan ....................... 455/574 |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0209601 A1 | 11/2003 | Chung |
| 2003/0236077 A1* | 12/2003 | Sivard ..................... 455/127.1 |
| 2004/0021572 A1 | 2/2004 | Schoen et al. |
| 2004/0041731 A1 | 3/2004 | Hisano |
| 2004/0082296 A1 | 4/2004 | Twitchell, Jr. |
| 2004/0100415 A1 | 5/2004 | Veitch et al. |
| 2004/0121793 A1 | 6/2004 | Weigele et al. |
| 2004/0135691 A1 | 7/2004 | Duron et al. |
| 2004/0183673 A1 | 9/2004 | Nageli |
| 2005/0043068 A1 | 2/2005 | Shohara et al. |
| 2005/0093702 A1 | 5/2005 | Twitchell, Jr. |
| 2005/0093703 A1 | 5/2005 | Twitchell, Jr. |
| 2005/0215280 A1 | 9/2005 | Twitchell, Jr. |
| 2005/0226201 A1 | 10/2005 | McMillin |
| 2005/0261037 A1* | 11/2005 | Raghunath et al. .......... 455/574 |
| 2006/0128349 A1* | 6/2006 | Yoon ....................... 455/343.2 |
| 2006/0135145 A1 | 6/2006 | Redi |
| 2006/0270382 A1* | 11/2006 | Lappetelainen et al. .. 455/343.2 |
| 2007/0135179 A1* | 6/2007 | Hardman et al. ............ 455/574 |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| WO | WO0068907 | 11/2000 |
| WO | WO0069186 | 11/2000 |

OTHER PUBLICATIONS

Ben Sommer et al., Group 4, Passive RF Tags.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAV's, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, AD HOC Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth-The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

"Scalable Routing Strategies for Ad hoc Wireless Networks", Atsushi Iwata et al., IEEE Journal on Selected Areas in Communications, Special Issue on Adhoc Networks, Aug. 1999, pp. 1369-79.

"Cluster Based Routing Protocol", Internet-Draft Mingliang, Jiang et al., National University of Singapore, Jul. 1999.

* cited by examiner

REMOTE SENSOR INTERFACE (RSI) STEPPED WAKE-UP SEQUENCE

CROSS-REFERENCE TO RELATED APPLICATIONS

This application is entitled to the benefit of, and claims priority to, provisional U.S. Patent Application Ser. No. 60/687,415 filed Jun. 3, 2005 and titled "CLASS-BASED SOFT HAND-OFF IN WIRELESS COMMUNICATIONS," and provisional U.S. Patent Application Ser. No. 60/691,884 filed Jun. 17, 2005 and titled "REMOTE SENSOR INTERFACE (RSI) STEPPED WAKE-UP SEQUENCE," the entirety of each of which is incorporated herein by reference.

INCORPORATION BY REFERENCE

The present application hereby incorporates by reference: U.S. Pat. No. 6,753,775 B2 (titled "Smart Container Monitoring System"); U.S. Pat. No. 6,745,027 B2 (titled "Class Switched Networks for Tracking Articles"); U.S. Pat. No. 6,665,585 B2 (titled "Method and Apparatus for Container Management"); U.S. Pat. No. 5,458,042 (titled "Container for Packaging an Object Provided with a Radio Frequency Transmission Device and Removable Element for Such a Container"); International Patent Application Publication No. WO 03/032501 A2, which international patent application designated the United States and was published in English (titled "Network Formation in Asset-Tracking System Based on Asset Class"); International Patent Application Publication No. WO 03/098851 A1, which international patent application designated the United States and was published in English (titled "LPRF Device Wake Up Using Wireless Tag"); U.S. Patent Application Publication No. 2005/0093703 A1 (titled "Systems and Methods Having LPRF Device Wake Up Using Wireless Tag"); U.S. Patent Application Publication No. 2005/0093702 A1 (titled "Manufacture of LPRF Device Wake Up Using Wireless Tag"); U.S. Patent Application Publication No. 2004/0082296 A1 (titled "Network Formation in Asset-Tracking System Based on Asset Class"); U.S. Patent Application Publication No. 2004/0183673 A1 (titled "Portable Detachable Self-Contained Tracking Unit for Two-Way Satellite Communication with a Central Server"); U.S. Patent Application Publication No. 2004/0021572 A1 ("Electronic baggage tracking and identification"); and U.S. patent application Ser. No. 11/306,765 (titled "Keyhole Communication Device for Tracking and Monitoring Shipping Container and Contents Thereof").

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the patent files and records of government agencies of countries wherein this patent document has been filed, but otherwise reserves all copyright rights whatsoever.

BACKGROUND

RSIs are utilized for remotely collecting data in the field and communicating the collected data to one or more centralized locations. For example, RSIs are utilized in tracking and/or monitoring assets that are stored and/or transported in association with wireless transceivers, such as radio frequency identification tags (RFIDs). In such implementations, such as those described in U.S. Patent Application Publication No. 2005/0093702 A1, an RSI has sometimes been previously referred to as a "wireless reader tag" or "WRT." The data regarding the tracked and/or monitored assets is communicated by an RSI to one or more central servers for processing. Such data is useful, for instance, in supply chain management. Such data further is useful, for instance, in homeland security, especially when the assets being tracked and/or monitored are being imported into the United States from foreign countries.

Of course, the RSIs of the present invention are preferably capable of wireless communications with external devices. For example, the RSI preferably communicates with other RSIs in forming one or more wireless networks. Furthermore, the RSI preferably communicates with a gateway that itself serves as a bridge to other networks, such as the Internet, a cellular network, or a Satellite network.

In order to reduce power consumption by the RSIs, attempts have been made to utilize a "wake-up receiver" to determine, according to predetermined criteria, when a higher power radio should be turned on for two-way wireless communications with the gateway. Such a wake-up sequence was described in the aforementioned U.S. Patent Application Publication No. 2005/0093702 A1. In that reference or other references, the wake-up receiver may have been referred to as a "WT Component," or on occasion, as a "tag turn-on circuit" or "TTOC." In addition, the signal received by the wake-up receiver for waking up the RSI is transmitted by a wake-up transmitter. The wake-up transmitter occasionally has been referred to as a "tag turn-on" or "TTO" in this previous reference or another reference, and the wake-up transmitter is capable of sending signals to other RSIs and/or gateways that may include wake-up receivers, TTOCs, or the like, for wake-up of the other RSIs and/or gateways. Unfortunately, the wake-up sequence performed in the aforementioned reference does provide a sufficient amount of reduction in the power consumption of the RSI or RSI-equivalent. Further, the previous wake-up sequence does not provide the opportunity for different functions to be triggered at different power levels.

The present invention relates in particular to a stepped wake-up sequence of an RSI in activating circuits thereof in response to a wake-up signal that is received from a gateway or another RSI. The stepped wake-up sequence provides extended duration of the life of the battery power supply of the RSI, especially in a noisy radio frequency (RF) environment. This wake-up sequence and the preferred circuit diagrams for performing this wake-up sequence is deemed to be an improvement over the general wake-up sequence performed by the "WT Component" described in detail, for example, in incorporated International Patent Application Publication No. WO 03/098851 A1.

SUMMARY OF THE PRESENT INVENTION

In addition to the aforementioned aspects and features of the present invention, it should be noted that the present invention further includes the various possible combinations of such aspects and features.

The present invention includes many aspects and features. In a first aspect of the invention, a wireless transceiver includes: a two-way wireless communication component capable of powering down to conserve energy and capable of powering up in response to an electronic signal, the two-way wireless communication component including a transmitter and a first receiver; and a second receiver that is configured to screen a radio frequency broadcast and provide the electronic signal to the two-way wireless communication component in order to power up the two-way wireless communication component. In particular, the second receiver is configured to: screen the radio frequency broadcast for first criteria, wherein the wireless transceiver draws a first electric current when screening the radio frequency broadcast for the first criteria, and screen the radio frequency broadcast for second criteria, wherein the wireless transceiver draws a second electric current when screening the radio frequency broadcast for the second criteria, the second electric current being an order of magnitude larger than the first electric current. Furthermore, the second receiver is adapted to draw substantially less current while awaiting receipt of and listening for a radio frequency broadcast than the current that the two-way wireless communication component would draw while awaiting receipt of and listening for a radio frequency broadcast.

In a feature of this aspect, the electronic signal is provided only if the first criteria and the second criteria are both met.

In a feature of this aspect, the second receiver draws on the order of magnitude of tens of microamps of electric current when screening the radio frequency broadcast for the second criteria, and the second receiver draws on the order of magnitude of hundreds of microamps of electric current when screening the radio frequency broadcast for the second criteria.

In a feature of this aspect, the second receiver further is configured to screen the radio frequency broadcast for third criteria, and the wireless transceiver draws on the order of magnitude of a milliamp of electric current when screening the radio frequency broadcast for the third criteria. Moreover, the screening for the third criteria is performed only if the first criteria and the second criteria are met. Additionally, the electronic signal may be provided only if the third criteria is met.

In a feature of this aspect, the first criteria is a particular frequency and wherein the second criteria is a particular modulation type.

In yet another feature of this aspect, the third criteria is specific data to be identified in the radio frequency broadcast.

In another aspect of the invention, a wireless transceiver includes: a two-way wireless communication device capable of powering down to conserve energy and capable of powering up in response to an electronic signal, the two-way wireless communication device including a transmitter and a first receiver; and a second receiver that is configured to screen a radio frequency broadcast and provide the electronic signal to the two-way wireless communication device in order to power up the two-way wireless communication device. Furthermore, the second receiver is configured to: screen the radio frequency broadcast for first criteria; screen the radio frequency broadcast for second criteria if the first criteria is met; and screen the radio frequency broadcast for third criteria if the second criteria is met. Moreover, the second receiver is adapted to draw substantially less current while awaiting receipt of and listening for a radio frequency broadcast than the current that the two-way wireless communication device would draw while awaiting receipt of and listening for a radio frequency broadcast.

In a feature of this aspect, the electronic signal is provided only if the first criteria, the second criteria, and the third criteria are met. The first criteria may be a particular frequency, the second criteria may be a particular modulation type, and the third criteria may be specific data identified in the radio frequency broadcast.

In another aspect of the invention, a wireless transceiver includes both a two-way wireless communication device having a transmitter and a first receiver and a second receiver, and a method of operating a wireless transceiver includes: powering down the two-way wireless communication device to conserve energy; and in response to receiving an electronic signal at the two-way wireless communication device, powering up the two-way wireless communication device. Furthermore, the second receiver provides the electronic signal to the two-way wireless communication device upon certain criteria being met. In particular, the second receiver screens a radio frequency broadcast for first criteria while drawing an electric current that only is on the order of magnitude of tens of microamps; and, if the first criteria is met, screens the radio frequency broadcast for second criteria while drawing an increased electric current that only is on the order of magnitude of hundreds of microamps. Furthermore, the second receiver is adapted to draw substantially less current than the two-way wireless communication device while awaiting receipt of and listening for a radio frequency broadcast.

In accordance with this aspect, the first criteria may be a particular frequency, and the second criteria may be a particular modulation type. The third criteria may be specific data that is identified in the radio frequency broadcast.

In yet another aspect of the invention, a wireless transceiver includes both a two-way wireless communication device having a transmitter and a first receiver and a second receiver, and a method of operating a wireless transceiver includes: powering down the two-way wireless communication device to conserve energy; and in response to receiving an electronic signal at the two-way wireless communication device, powering up the two-way wireless communication device. Furthermore, the second receiver provides the electronic signal to the two-way wireless communication device upon certain criteria being met. In particular, the second receiver screens a radio frequency broadcast for first criteria; and, if the first criteria is met, screens the radio frequency broadcast for second criteria; and, if the second criteria is met, screens the radio frequency broadcast for third criteria. If the third criteria is met, then the second receiver provides the electronic signal to the two-way wireless communication device. Furthermore, the second receiver is adapted to draw substantially less current than the two-way wireless communication device while awaiting receipt of and listening for a radio frequency broadcast.

In accordance with a feature this aspect, the first criteria may be a particular frequency, and the second criteria may be a particular modulation type.

In another feature of this aspect, the third criteria may be specific data that is identified in the radio frequency broadcast such as, for example, a common designation of an ad hoc network. The common designation may be a class-based designation.

In another aspect of the invention, an asset-tracking system includes a wireless transceiver in accordance with any of the foregoing aspects as well as one or more sensor devices that are disposed externally to and in proximity of the wireless transceiver. The asset-tracking system may be used to read the one or more sensor devices and the asset-tracking system may utilize class-based, ad hoc hierarchical networks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

One or more embodiments of the present invention will be described in detail with reference to the accompanying drawings which are briefly described below, and wherein the same elements are referred to with the same reference numerals, and wherein.

DETAILED DESCRIPTION

Figure 1:
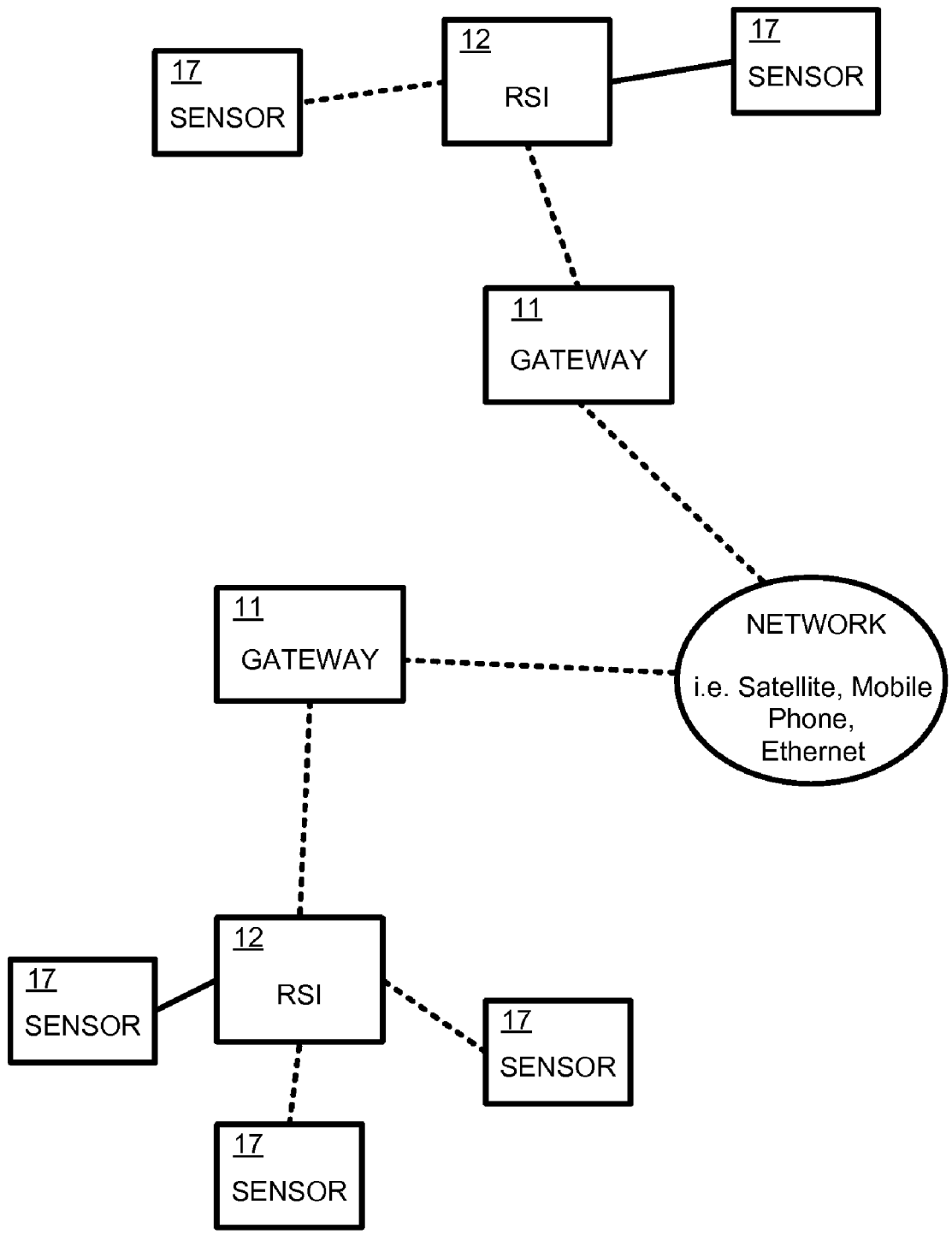
FIG. 1 is a block diagram of an exemplary wireless communication system in accordance with the preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, the preferred embodiments of the present invention are next described. The following description of the preferred embodiment(s) is merely exemplary in nature and is in no way intended to limit the invention, its application, or uses.

FIG. 1 is a block diagram of an exemplary wireless communication system in accordance with the preferred embodiments of the present invention. As shown, the system 10 includes one or more gateways 11, each of which communicates wirelessly with one or more remote sensor interface ("RSI") 12 following wake-up of the RSI 12 by the gateway 11. As will be evident to the Ordinary Artisan, the gateway 11 may be any central radio unit, the design and implementation of which will likewise be apparent to the Ordinary Artisan, that is capable of initiating and carrying out wireless communication with RSIs 12. Indeed, it will likewise be evident that the specific communication devices and methods described and illustrated herein may be used for wireless communication between other types of radio devices. The gateway 11 serves as a fixed-area or mobile interface between RSIs 12 and other networks, such as the Internet, a cellular network, or a Satellite network. Though not shown, one or more central servers, used for functions such as tracking and storing monitored data and the like, may be linked to the gateways 11 via the network.

Optionally, the gateway may consist of the Wide Area Network (WAN) interface, the RSI interface, a hard drive that contains the data store or database, server control and application specific software. By including server functionality in the gateway 11, WAN interface cost may be reduced. As will be apparent to the Ordinary Artisan, the WAN may be utilized for backup and remote operation but is not required.

Figure 2:
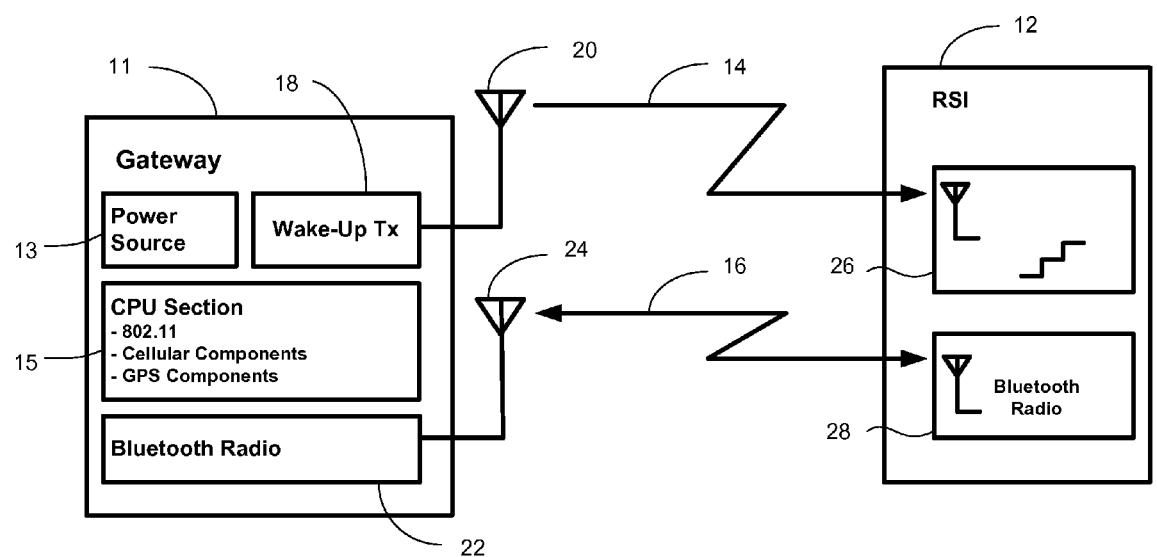
FIG. 2 is a diagram illustrating wireless communication between one of the gateways and one of the remote sensor interfaces of FIG. 1.

FIG. 2 is a diagram illustrating wireless communication between one of the gateways and one of the remote sensor interfaces of FIG. 1. As shown therein, the gateway 11 includes a power source 13 such as a battery or connection to an external power source for powering systems of the gateway 11; a central processing unit (CPU) section 15 for controlling operations of the gateway 11; a wake-up transmitter 18 coupled to an external patch antenna 20, such as a 6.5 dBi omni-directional antenna, for transmitting wake-up signals; and a two-way wireless communication device 22 including an antenna 24 for two-way communications. The two-way wireless communication device 22 is preferably a standards based radio such as, for example, a Bluetooth radio, a WiFi radio, a Zigbee radio, an Ultra-Wideband (UWB) radio, or a WiMAX radio, with a Bluetooth radio being the most preferred. The CPU section 15 most predominantly includes a microprocessor and 802.11 or other communication capability, but optionally, may further include a global positioning system (GPS) and cellular telephony communications capabilities.

Figure 5:
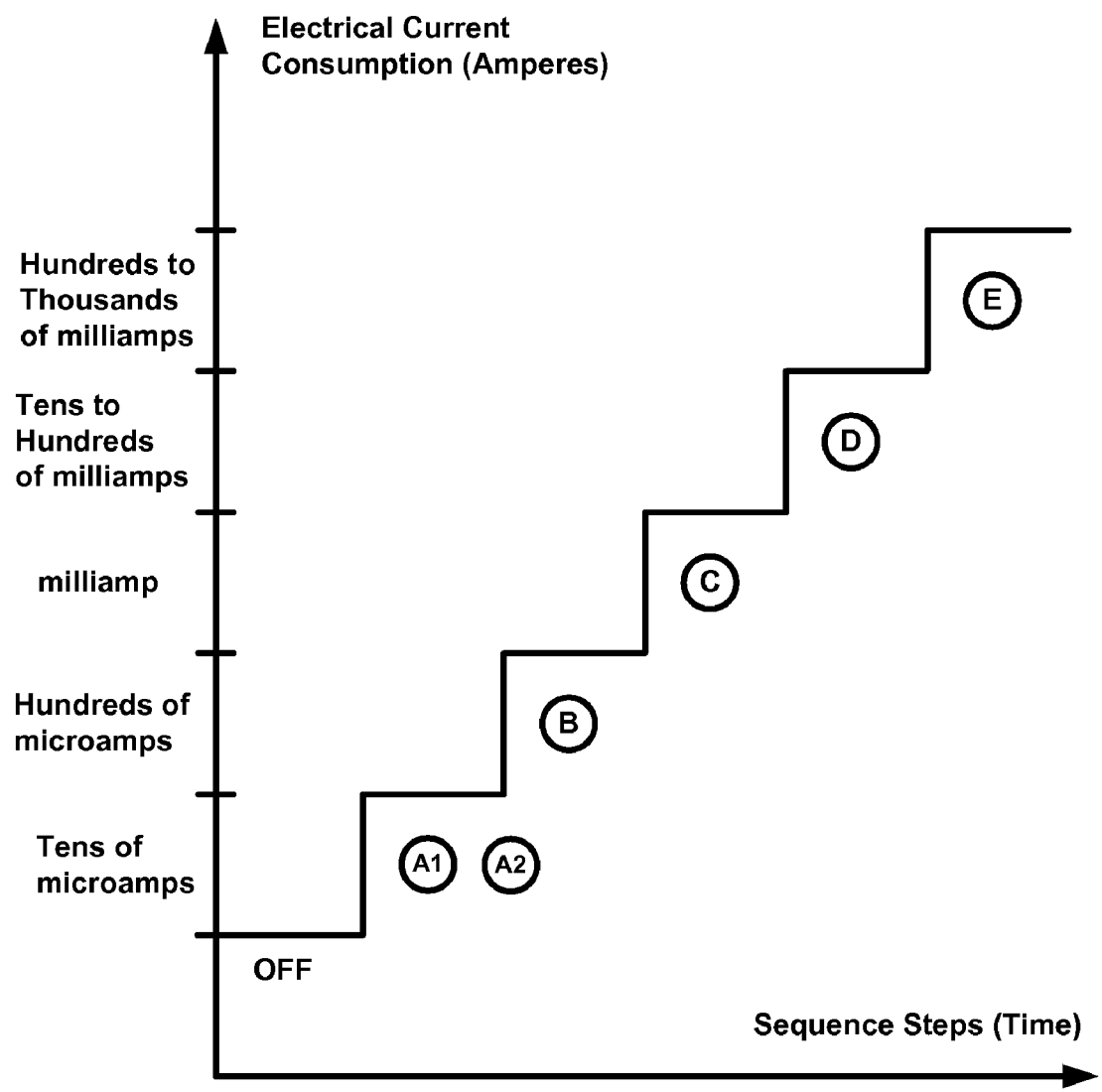
FIG. 5 is a graphical representation of a stepped wake-up sequence, performed by the wake-up receiver of FIG. 4, in accordance with a preferred embodiment of the present invention.

The RSI 12 includes a wake-up receiver 26, for receiving wake-up signals from the gateway 11 and/or other RSIs 12 and, in turn, prompting the stepped wake up sequence of FIG. 5, and a two-way wireless communication device 28, including an antenna 24 etched on a printed circuit board, for two-way communications. The two-way wireless communication device 28 is preferably a standards based radio such as, for example, a Bluetooth radio, a WiFi radio, a Zigbee radio, an Ultra-Wideband (UWB) radio, or a WiMAX radio, but which in any case is generally selected to match the two-way wireless communication radio 22 of the gateway 11. The wake-up receiver 26 further includes an ultra-low power consumption receiver and includes, for example, an etched antenna on a printed circuit board.

In general, wireless communication between the gateway 11 and the RSI 12 may be carried out as follows. The gateway 11 first transmits, via the wake-up transmitter 18, a wake-up signal 14 to the RSI 12. At the RSI 12, the wake-up signal 14 is received by a wake-up receiver 26 of the RSI 12, which executes a stepped wake up sequence as shown in FIG. 5 in accordance with the present invention. Upon full wake-up of the RSI 12, the gateway 11 and RSI 12 engage in the two-way communications 16 using the standards based radios 22, 28. As shown in the illustrated embodiment, the standards based radios 22, 28 that are used are Bluetooth radios. Each of the gateway 11 and RSI 12 are furthermore capable of two-way communications with other RSIs 12 or gateways 11 of a network.

The RSI 12 may be associated with one or more sensors 17, or the RSI 12 itself may serve as a gateway to other RSIs 12. One particularly common application for RSIs 12 is in the tracking of various assets, wherein each of a plurality of RSIs 12 is associated with a particular asset and/or an RSI 12 is associated with an asset, such as a shipping container, pallet, or the like, that carries or contains other assets. The use of devices similar to RSIs 12 to track assets has been described in U.S. Patent Application Publication No. 2005/0093702 A1, in which such devices are often generally referred to as "wireless transceivers" or "WRTs." Insofar as the RSI 12 is associated with assets, such as shipping containers and/or contents thereof, the RSI 12 further preferably is capable of interfacing or interacting with asset monitoring sensors 17 that monitor conditions, phenomena, or the like inside or outside the container and/or inside or outside a particular asset in the container. Such sensors 17 may include, without limitation, electronic seals capable of detecting openings and/or closures of the container, cameras, microphones, RF signal detectors, light detectors, temperature sensors, radiation sensors, chemical sensors, and motion detectors. The particular use and implementation of RSIs in shipping containers has been further described in U.S. patent application Ser. No. 11/306,765. The RSI 12 preferably includes a sensor board having circuitry for interfacing with such asset monitoring sensors 17. The two-way communications 16 convey commands and queries from the gateway 11 to the RSI 12 and convey data, which may include sensor data acquired from the monitoring sensors 17, from the RSI 12 to the gateway 11. As the RSI 12 is preferably deployed and mobile with assets and asset containers, the RSI 12 preferably includes the wake-up receiver 26 and executes the stepped wake up sequence of FIG. 5 in order to minimize power consumption of the RSI 12, which avoids frequent servicing (such as the changing of a battery).

A wake-up signal may be specifically directed toward a particular RSI 12 as identified by a unique identifier of the RSI 12. In this regard, the wake-up signal would include a unique identifier of the RSI 12.

Alternatively, a wake-up signal may be specifically directed toward a particular class of RSIs 12 as identified by a class designation. In this regard, the wake-up signal would include the class to which the wake-up signal is directed.

In yet another alternative, a wake-up signal may be directed to all RSIs 12. In this regard, the wake-up signal would include an indication to this effect. Preferably in class based systems, such a wake-up signal would include a class designation that includes, as members of the class, all of the RSIs 12 (i.e., an all encompassing or root class).

Figure 3:
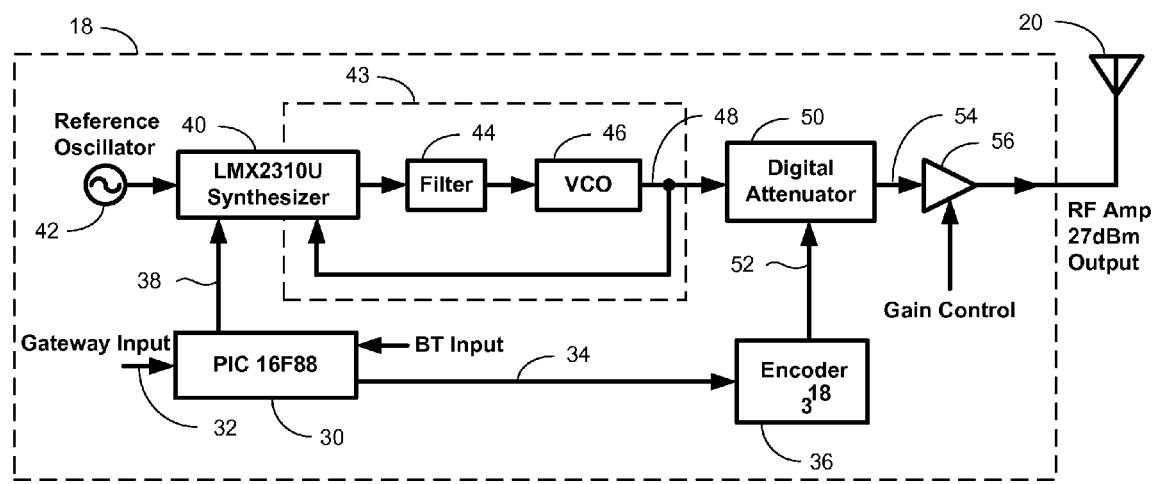
FIG. 3 is a block diagram of a first exemplary implementation of a wake-up transmitter for use in the gateway of FIG. 2.

FIG. 3 is a block diagram of a first exemplary implementation of a wake-up transmitter 18 for use in the gateway 11 of FIG. 2. A microcontroller 30, which may be, for example, a RISC-type microcontroller such as the PIC-16F88, available from Microchip Technology of Chandler, Ariz., receives input signals 32 from, for example, the CPU section 15 of a gateway 11 that conveys digital information, such as class and other data, to be transmitted by the wake-up transmitter 18. An output 34 of the microcontroller 30 passes the digital information to be transmitted to an encoder 36. Another output 38 of the microcontroller 30 dictates channel selections, dwell times, which are generally less than 0.4 seconds, and modulation levels for frequency hopping by the wake-up transmitter 18 in its transmissions. An ultra-low power frequency synthesizer 40, for example the LMX2310U Synthesizer, available from National Semiconductor, coupled to a reference oscillator 42, receives the frequency hopping related output 38 of the microcontroller 30. The synthesizer 40, in a feedback controlled loop 43 with a filter 44 and a voltage-controlled oscillator (VCO) 46, operating, for example, in a 2 to 3 Gigahertz (GHz) range, establishes the frequency of the VCO output 48 according to the frequency hopping scheme dictated by the output 38 of the microcontroller 30. A digital attenuator 50 then modulates the VCO output 48 according to an output 52 of the encoder 36. For example, a 5-bit digital attenuator is used for 70% modulation. The output 54 of the digital attenuator 50 conveys the digital information to be transmitted by the wake-up transmitter 18, at the output frequency of the VCO 46, to an amplifier 56. The amplifier 56 regulates the power of transmissions of the antenna 20, namely, the wake-up signals 14 that convey the digital information to a wake-up receiver 26 of, for example, an RSI 12.

The frequency hopping scheme dictated by the microcontroller 30 is preferably in compliance with applicable regulations, such as those promulgated by the Federal Communications Commission (FCC). For example, one frequency hopping scheme suitable for use in a preferred embodiment of the present invention is the frequency hopping spread spectrum (FHSS) convention, in which the 2.4000 to 2.4825 GHz ISM (Industrial, Scientific, and Medical) band is broken into a minimum of 75 channels (in Bluetooth communications, for instance, 79 hopping channels are utilized), each 1 Mega-Hertz (MHz) wide, with a 2 MHz lower guard band and a 3.5 MHz upper guard band. FHSS systems generally operate on time-division multiple access (TDMA) schemes with varying standards with regard to the number of frequency hops per second.

Modulation of the output of the VCO 46 by the digital attenuator 50 embeds the digital information to be transmitted by the wake-up transmitter 18 into the output 54 of the attenuator 50. This modulation also is preferably in compliance with regulations. For example, Bluetooth and digital enhanced cordless telecommunications (DECT) standards utilize Gaussian frequency-shift keying (GFSK) modulation, whereas HomeRF and FHSS 802.11 use 2-level and 4-level frequency-shift keying (FSK) to take advantage of the higher efficiencies offered from saturated power amplifiers. Under current FCC regulations, an FHSS system operating in the 2.4 GHz band can deliver a maximum output power of +30 dBm (1 Watt). The regulations further specify that FHSS systems must use a minimum of 75 hopping channels, with each channel having a 20 dB bandwidth not exceeding 1 MHz, and that the average time of occupancy on any frequency must not exceed 0.4 seconds within any 30 second time period.

Figure 4:
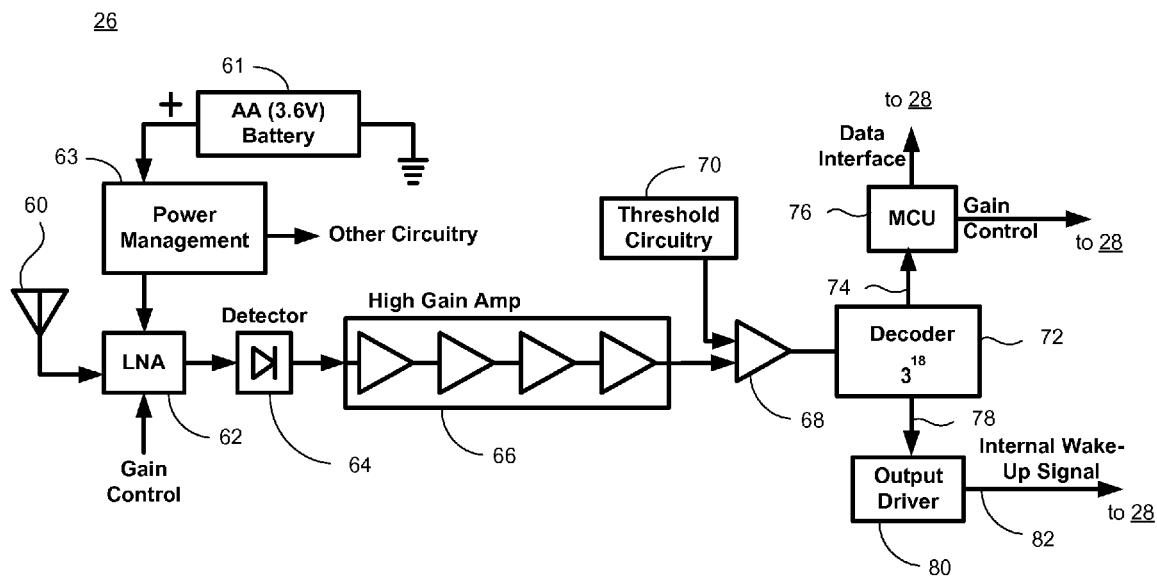
FIG. 4 is a block diagram of a first exemplary implementation of a wake-up receiver for use in the remote sensor interface of FIG. 2.

FIG. 4 is a block diagram of a first exemplary implementation of a wake-up receiver 26 for use in the RSI 12 of FIG. 2. The wake-up signals 14 from, for example, the wake-up transmitter 18 of the gateway 11 of FIG. 2, along with other electromagnetic noise signals, are received by an antenna 60, and are boosted by a low noise amplifier ("LNA") 62 of the wake-up receiver 26. An internal power source 61 comprising, for example, a battery, powers the LNA 62 and other components or circuits of the wake-up receiver 26 through a power management module 63. A broadband detector 64 receives the output of the LNA 62 and, when it detects the likely presence of a wake-up signal over other electromagnetic noise signals, the detector 64 passes the LNA output to a high gain amplifier 66. The output of the high gain amplifier 66, specifically, the wake-up signal boosted by the LNA 62 and high gain amplifier 66, is passed to a conditional gate 68. A threshold circuit 70 dictates a threshold criterion to the conditional gate 68 that controls the opening of the gate 68 whereby the gate 68 is opened when the output of the high gain amplifier 66 satisfies the threshold criterion.

Signals reaching the gate 68 and satisfying the threshold criterion are then passed to the decoder 72 that extracts the digital information therein, such as class and/or other data embedded in signals by, for example, the encoder 36 of the wake-up transmitter 18 of FIG. 3. Thus, the decoder 72 preferably operates according to the same standard, such as GFSK or FSK, as the encoder 36 of the wake-up transmitter, such as the one illustrated in FIG. 3.

A first output 74 of the decoder 72 conveys the extracted digital information to a multi-point control unit ("MCU") 76. The MCU 76 passes the extracted digital information to, for example, the two-way wireless communication device 28 (the standards based radio) of the RSI 12 of FIG. 2, thereby providing the data interface to the radio 28. The MCU 76 also drives the gain control circuits (not shown) of the two-way wireless communication device 28. A second output 78 of the decoder 72 prompts an output driver 80 to send an internal wake-up signal 82 to the two-way wireless communication device 28 of the RSI 12 causing the standards based radio thereof to enter active receive mode and/or active transmit mode.

FIG. 5 is a graphical representation of a stepped wake-up sequence, performed by the wake-up receiver 26 of FIG. 4, in accordance with a preferred embodiment of the present invention. FIG. 5 illustrates, in general, the operation of any standards based radio that may be utilized. In order to reduce unnecessary power consumption by the RSI 12, and, in particular, to reduce power consumption of the standards based radio 28 of the RSI 12 that is used for two-way wireless communications 16 (FIG. 2), the standards based radio 28 generally resides in a low or no power consumption state. The standards based radio 28 may sometimes be referred to as being in a standby mode or a sleep mode when in the low power consumption state, and may sometimes be referred to as being turned off when in the no power consumption state (i.e., so that no power is consumed by it while it otherwise would be idle). While the standards based radio 28 is in either of these states, the wake-up receiver 26 preferably operates or resides in the first domain "A" of FIG. 5 (subdivided into subdomains "A1" and "A2"), wherein the RSI 12 draws electrical current that is only on the order of magnitude of tens of microamps.

In the first subdomain "A1" of domain "A1," the LNA 62 of the wake-up receiver 26 passes signals to the detector 64 while other components of the wake-up receiver 26, such as the high gain amplifier 66 and the standards based radio 28, remain in an inactive state. When the detector 64 determines that a wake-up signal is likely present, for example, by way of a measured signal strength that prevails over any present RF noise, the RSI 12 and, specifically, the wake-up receiver 26 enters the second subdomain "A2" of FIG. 5.

In the second subdomain "A2" of FIG. 5, the RSI 12 overall draws on the order of tens of microamps of electrical current from the battery 61, primarily due to the increased activity of the wake-up receiver 26. Specifically, in this subdomain "A2", the wake-up receiver 26 evaluates the signal for one or more particular criteria, such as the presence of a particular modulation in the possible wake-up signal detected in subdomain "A1", which signal may convey digital information. In this regard, the high gain amplifier 66, threshold circuitry 70, and conditional gate 68 are activated and the signal is analyzed with regard to amplitude, frequency and/or phase to determine if the signal is modulated according to the applicable standard, such as GFSK or FSK, that is being utilized in the operation of the decoder 72. This determination is typically completed within 30 microseconds of the RSI 12 entering the second subdomain "A2". If the signal is not modulated according to the applicable standard (a situation where digital information is not going to be extracted from the signal by the decoder 72), then the signal is deemed not to be a wake-up signal and the RSI 12 returns to the first operational subdomain "A1". On the other hand, if the signal is modulated according to the standard of the decoder 72, then the RSI 12, and specifically the wake-up receiver 26, enters the second domain "B" of FIG. 5.

In the second domain "B" of FIG. 5, the RSI 12 overall draws on the order of magnitude of hundreds of microamps of electrical current from the battery 61, primarily due to still greater activity of the wake-up receiver 26. In this domain, the wake-up receiver 26 receives a modulated signal and extracts and interprets digital information therefrom. In this regard, the decoder 72 is activated and extracts digital preamble information from the modulated signal. For example, the digital preamble information embedded in the wake-up signal 14 transmitted by the gateway 11 of FIG. 2 may include an indication of whether the signal or message is of a type intended for RSIs 12, such indication being determinative of whether the RSI 12 enters the third domain "C" or returns to the first domain "A," wherein if the preamble of the wake-up signal is of a type intended for RSIs 12, then the third domain "C" preferably is entered, and if the preamble of the wake-up signal is not of a type intended for the RSI 12, then the first domain "A" preferably is re-entered.

In the third domain "C" of FIG. 5, the RSI 12 overall draws on the order of magnitude of a milliamp of electrical current from the battery 61, primarily due to still greater activity of the wake-up receiver 26. In this domain, the wake-up receiver 26 receives a modulated signal and extracts and interprets digital information therefrom. In this regard, the decoder 72 is activated and extracts digital information such as class and/or other data from the modulated signal. The extraction is typically completed within 300 microseconds. For example, the digital information embedded in the wake-up signal 14 transmitted by the gateway 11 of FIG. 2 may include a class that is determinative of whether the RSI 12 enters the fourth domain "D" or returns to the first domain "A," wherein if the class of the wake-up signal matches a class of the RSI 12, then the fourth domain "D" preferably is entered, and if the class of the wake-up signal does not match a class of the RSI 12, then the first domain "A" preferably is re-entered.

In the fourth domain "D" of FIG. 5, the RSI 12 overall draws on the order of tens to hundreds of milliamps of electrical current from the battery 61, primarily due to the standards based radio 28 actively receiving data. In this domain, the wake-up receiver 26 prompts further activation of RSI circuits to receive wireless communications from the gateway 11 or other RSIs 12.

In particular, the wake-up receiver 26 "wakes up" the standards based radio of the RSI 12 whereby the RSI 12 preferably returns to a state in which it begins to actively receive data in communications from a gateway 11 or another RSI 12. The RSI 12 may be awakened from a standby or sleep mode or, preferably, from a no power consumption state where the standards based radio 28 is turned off. Such communications received by the RSI 12 may configure the RSI 12 with regard to sensors 17 with which the RSI 12 is associated. Alternatively, the commands received may configure the RSI 12 with regard to a periodic wake-up schedule for periodic exchanges of communications with the gateway 11. The communications received further may alter a class designation of the RSI 12, may prompt the RSI 12 to communicate with other RSIs 12, may relate to network formations among multiple RSIs 12, or the like.

The fifth domain "E" is entered when the standards based radio 28 actively transmits data. In this fifth domain "E", the RSI 12 overall draws on the order of magnitude of hundreds to thousands of milliamps of electrical current from the battery 61, primarily due to the active transmission of data by the standards based radio. In particular, the two-way wireless communication device 28 of the RSI 12 actively transmits wireless communications to the gateway 11 or to one or more other RSIs 12. Thus, though the two-way wireless communication device 28 of the RSI 12 is active in both the fourth domain "D" and the fifth domain "E", the two domains are distinguished because actively transmitting signals (domain "E") generally draws substantially more electrical current than actively receiving signals (domain "D").

With particular regard to some examples of specific standards based radios, Bluetooth class 1 radios draw, on average, approximately 40 milliamps when actively receiving data and draw, on average, approximately 100 milliamps when actively transmitting data; WiFi radios draw, on average, approximately 175 milliamps when actively receiving data and draw, on average, approximately 400 milliamps when actively transmitting data; and Zigbee class 2 radios draw, on average, approximately 30 milliamps when actively receiving data and draw, on average, approximately 65 milliamps when actively transmitting data.

As will be appreciated by the Ordinary Artisan, the RSI 12 will operate or reside a majority of the time within the first, second, and third domains (domains "A", "B" and "C") and the overall power consumption rate of the RSI 12 arising primarily from operation of the wake-up receiver 26 will be much less than if only the standards based radio 28 were used to monitor for communications intended for the RSI 12. Moreover, by utilizing a stepped wake-up sequence in the wake-up receiver 26, an even lower power consumption rate is realized. Indeed, it is believed that a majority of the time the RSI 12 will reside within the first domain "A", during which time the RSI 12 as a whole will draw only on the order of tens of microamps of current. Indeed, by first detecting for the presence of a likely signal within a noisy RF environment, substantial power savings can be achieved using this preferred stepped wake-up sequence because the attempt to extract meaningful data from a received signal, which is an exercise that results in significantly increased power consumption, is not attempted if the signal is determined to be noise.

As a result of the present invention, the RSI 12 enjoys improved power consumption (lower power consumption) and an extended life of the power source of the RSI 12 is promoted. Indeed, it is believed that an RSI 12 may operate for several years even in an RF noisy environment, thereby even possibly outlasting the useful life of its power source.

Figure 6:
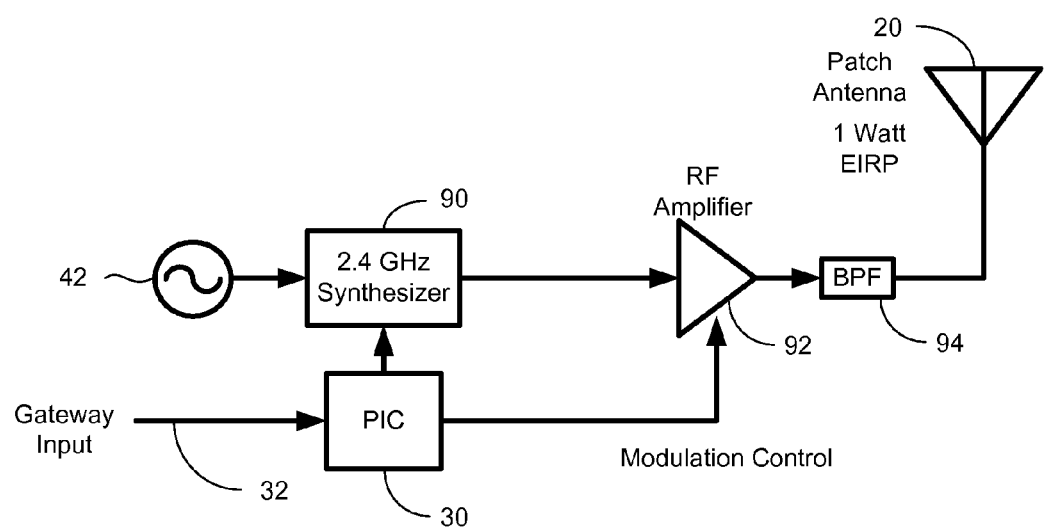
FIG. 6 is a block diagram of a second exemplary wake-up transmitter, for use in the gateway of FIG. 2.

FIG. 6 is a block diagram of a second exemplary wake-up transmitter 88 for use in the gateway of FIG. 2. As with the first exemplary wake-up transmitter 18, a microcontroller 30 receives input signals 32 from, for example, the CPU 15 of a gateway 11 that conveys digital information, such as class and other data, to be transmitted by the wake-up transmitter 88. However, the transmitter 88 of FIG. 6 utilizes a synthesizer 90, which may be a 2.4 GHz synthesizer, into which other components and functions illustrated in the block diagram of FIG. 3 have been consolidated. For example, the filter 44, VCO 46, digital attenuator 50, and encoder 36 of FIG. 3 may be consolidated into the functioning of the synthesizer 90 through appropriate programming (e.g., software). The synthesizer 90 of FIG. 6 is coupled to a reference oscillator 42, and the output of the synthesizer 90 is modulated under the control of the microcontroller 30 using an RF amplifier 92 whose output is conveyed through a band pass filter 94 to the antenna for transmission.

Figure 7:
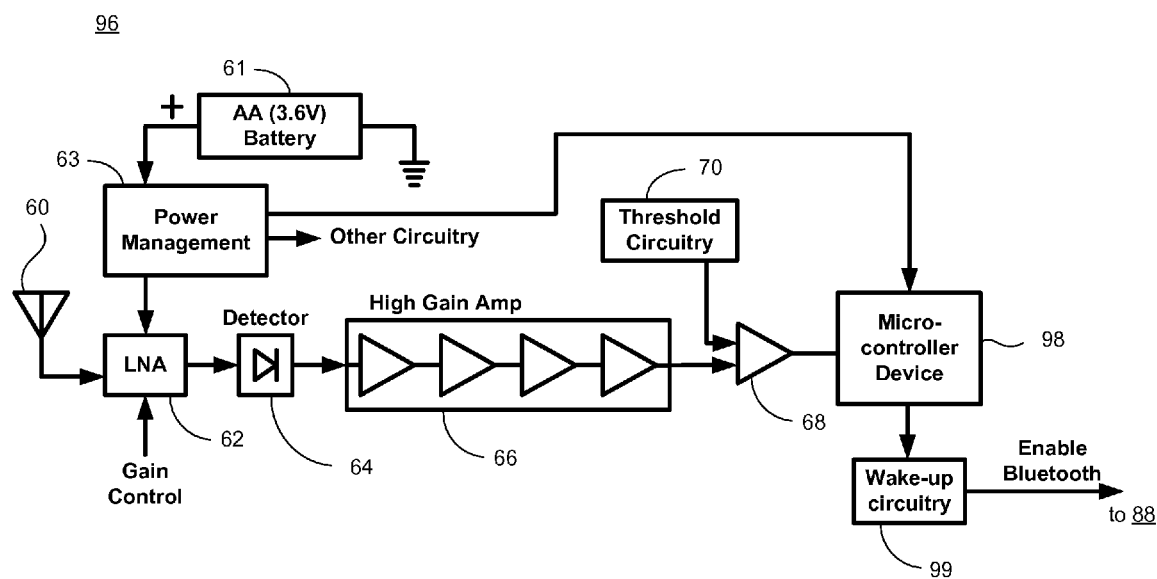
FIG. 7 is a block diagram of a second exemplary wake-up receiver for use in the remote sensor interface of FIG. 2.

FIG. 7 is a block diagram of a second exemplary wake-up receiver 96 for use in the RSI 12 of FIG. 2. As with the first exemplary wake-up receiver 26, the wake-up signals 14 from, for example, the first or second exemplary wake-up transmitter 18, 88 of the gateway 11 of FIG. 2, along with other electromagnetic noise signals, are received by an antenna 60, and are boosted by a low noise amplifier ("LNA") 62 of the wake-up receiver 96. An internal power source 61 comprising, for example, a battery, powers the LNA 62 and other components or circuits of the wake-up receiver 96 through a power management module 63. A broadband detector 64 receives the output of the LNA 62 and, when it detects the likely presence of a wake-up signal over other electromagnetic noise signals, the detector 64 passes the LNA output to a high gain amplifier 66. The output of the high gain amplifier 66, specifically, the wake-up signal boosted by the LNA 62 and high gain amplifier 66, is passed to a conditional gate 68. A threshold circuit 70 dictates a threshold criterion to the conditional gate 68 that controls the opening of the gate 68 whereby the gate 68 is opened when the output of the high gain amplifier 66 satisfies the threshold criterion.

It will be appreciated by the Ordinary Artisan that certain components and functions of the block diagram of FIG. 4 may be consolidated into the functioning of a microcontroller device 98. For example, the threshold circuitry 70, decoder 72, and MCU 76 of FIG. 4 may be consolidated into the functioning of the microcontroller device 98 through appropriate programming (e.g., software). This may readily be recognized by comparing the block diagram of FIG. 7 for the second exemplary wake-up receiver 96 with the block diagram of FIG. 4 for the first exemplary wake-up receiver 26. In this case, the microcontroller device 98 could be, for example, a PLL decoder and control processor whose output drives the wake-up circuitry 99 that enables the two-way wireless communication device 28 of the RSI 12. Alternatively, the microcontroller device 98 could be a programmable logic device and processor.

Figure 8:
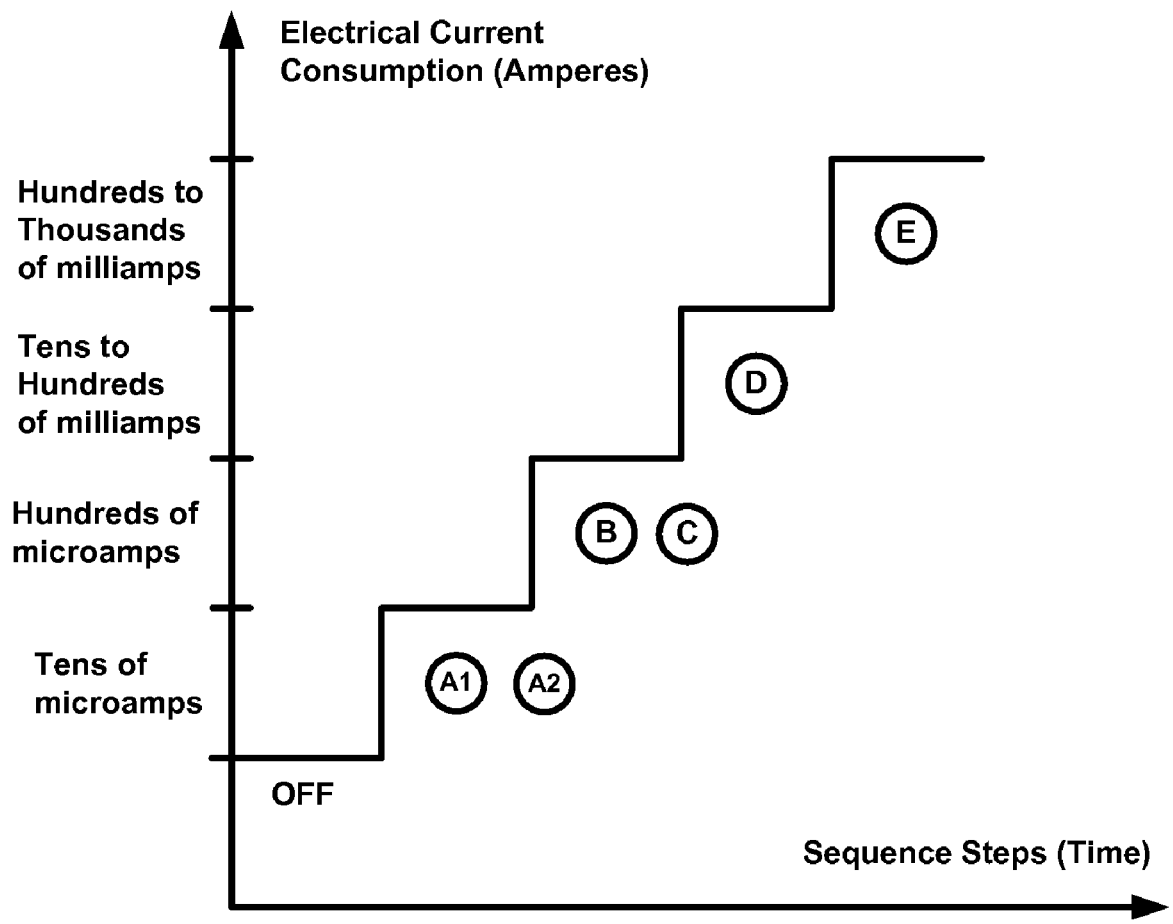
FIG. 8 is a graphical representation of an alternative stepped wake-up sequence, performed by the wake-up receiver of FIG. 7, in accordance with another preferred embodiment of the present invention.

FIG. 8 is a graphical representation of an alternative stepped wake-up sequence, performed by the wake-up receiver 96 of FIG. 7, in accordance with another preferred embodiment of the present invention. In consolidating functioning into the microcontroller device 98 in the wake-up receiver 96 as illustrated in FIG. 7, the domains "B" and "C" of FIG. 5 may be merged as illustrated in FIG. 8, wherein only four domains are shown. As with the sequence of FIG. 4 for the first exemplary wake-up receiver 26, the second exemplary wake-up receiver 96 will continue to draw electrical current on the order of tens of microamps while listening for the presence of a wake-up signal, for example, by way of a measured signal strength that prevails over any present RF noise, and will draw only hundreds of microamps, on average, while determining whether a signal contains data. However, the second exemplary wake-up receiver 96 will still draw only hundreds of microamps, on average, while determining whether the data, once extracted from a signal detected out of RF noise, in fact indicates that the RSI 12 is an intended recipient of a communication such that the standards based radio of the RSI 12 should be woken by the wake-up receiver 96. It is believed that, by enabling the microcontroller device 98 to make the latter determination rather than through the circuitry of the wake-up receiver 26 of FIG. 4, an overall decrease in the power consumption rate may be achieved on behalf of the wake-up receiver 96 (and thus the RSI 12) during this determination.

With further regard to FCC rules (47 CFR § 15), Part 15, Section 249 thereof relates to operation within the 2400-2483.5 MHz range and to field strengths of emissions from intentional radiators. Part 15, section 205 relates to restricted bands of operation, wherein only spurious emissions are permitted, such as the 2310-2390 MHz and 2483.5-2500 MHz ranges. Part 15, section 245 relates to operation within the 2407.5-2417.4 MHz band for intentional radiators used as field disturbance sensors, excluding perimeter protection systems. Part 15, section 247 relates to intentional radiators in the 2400-2483.5 MHz range.

In any 100 kilo-Hertz (kHz) bandwidth outside the frequency band in which the spread spectrum or digitally modulated intentional radiator is operating, the radio frequency power that is produced by the intentional radiator shall be at least 20 dB below that in the 100 kHz bandwidth within the band that contains the highest level of the desired power, based on either an RF conducted or a radiated measurement.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A system of wireless transceivers, comprising:
   (a) a first plurality of wireless transceivers, each respective wireless transceiver of the first plurality of wireless transceivers comprising:
      (i) a two-way wireless communication component configured to power down to conserve energy and configured to power up in response to an electronic signal, the two-way wireless communication component including a transmitter and a first receiver, and
      (ii) a second receiver that is configured to:
         (A) screen radio frequency broadcasts for first criteria, wherein the respective wireless transceiver of the first plurality of wireless transceivers draws a first electric current when screening for the first criteria,
         (B) for each broadcast in which the first criteria is met, screen such radio frequency broadcast for second criteria, wherein the respective wireless transceiver of the first plurality of wireless transceivers draws a second electric current when screening such radio frequency broadcast for the second criteria, the second electric current being an order of magnitude larger than the first electric current, and
         (C) for each broadcast in which the second criteria is met, screen such radio freguency broadcast for specific data identifying a designation out of a plurality of predefined designations of the respective wireless transceiver of the first plurality of wireless transceivers, wherein the respective wireless transceiver of the first plurality of wireless transceivers draws a third electric current when screening such radio frequency broadcast for the specific data, the third electric current being larger than the second electric current,
      (iii) wherein the two-way wireless communication component is configured to screen radio frequency broadcasts for specific data in each broadcast identifying a designation out of the plurality of predefined designations of the respective wireless transceiver of the first plurality of wireless transceivers, and
      (iv) wherein the second receiver is adapted to draw substantially less current while screening radio frequency broadcasts for specific data identifying a designation than the current that the two-way wireless communication component draws while screening radio frequency broadcasts for specific data identifying a designation;

(b) a second plurality of wireless transceivers, each respective wireless transceiver of the second plurality of wireless transceivers comprising:
  (i) a two-way wireless communication component configured to power down to conserve energy and configured to power up in response to an electronic signal, the two-way wireless communication component including a transmitter and a first receiver, and
  (ii) a second receiver that is configured to:
    (A) screen radio frequency broadcasts for first criteria, wherein the respective wireless transceiver of the second plurality of wireless transceivers draws a first electric current when screening for the first criteria,
    (B) for each broadcast in which the first criteria is met, screen such radio frequency broadcast for second criteria, wherein the respective wireless transceiver of the second plurality of wireless transceivers draws a second electric current when screening such radio frequency broadcast for the second criteria, the second electric current being an order of magnitude larger than the first electric current, and
    (C) for each broadcast in which the second criteria is met, screen such radio frequency broadcast for specific data identifying a designation out of a plurality of predefined designations of the respective wireless transceiver of the second plurality of wireless transceivers, wherein the respective wireless transceiver of the second plurality of wireless transceivers draws a third electric current when screening such radio frequency broadcast for the specific data, the third electric current being larger than the second electric current,
  (iii) wherein the two-way wireless communication component is configured to screen radio frequency broadcasts for specific data in each broadcast identifying a designation out of the plurality of predefined designations of the respective wireless transceiver of the second plurality of wireless transceivers, and
  (iv) wherein the second receiver is adapted to draw substantially less current while screening radio frequency broadcasts for specific data identifying a designation than the current that the two-way wireless communication component draws while screening radio frequency broadcasts for specific data identifying a designation; and (c) a gateway configured to make radio frequency broadcasts,
  (i) wherein at least some of the radio frequency broadcasts made by the gateway include specific data identifying a designation out of the plurality of predefined designations of each respective wireless transceiver of the first plurality of wireless transceivers, whereby the gateway causes the first plurality of wireless transceivers to awaken and to communicate without awakening or communicating with the second plurality of wireless transceivers, and
  (ii) wherein at least some of the radio frequency broadcasts made by the gateway include specific data identifying a designation out of the plurality of predefined designations of each respective wireless transceiver of the second plurality of wireless transceivers, whereby the gateway causes the second plurality of wireless transceivers to awaken and to communicate without awakening or communicating with the first plurality of wireless transceivers.

2. The system of claim 1, wherein the second receiver of each respective wireless transceiver of the first plurality of transceivers is configured to, for each broadcast in which the second criteria is met, screen such radio frequency broadcast for specific data identifying any designation of the plurality of predefined designations of that respective wireless transceiver.

3. The system of claim 1, wherein the second criteria is specific data.

4. The system of claim 1, wherein the first current that is drawn while screening radio frequency broadcasts for first criteria by a particular wireless transceiver of the first plurality is on the order of magnitude of tens of microamps of electric current, and wherein the second current that is drawn while screening radio frequency broadcasts for second criteria by the particular wireless transceiver of the first plurality is on the order of magnitude of hundreds of microamps of electric current.

5. The system of claim 1, wherein the second receiver of each transceiver of the first plurality of transceivers is configured to, for each broadcast in which the second criteria is met, screen a preamble of such radio frequency broadcast for specific data identifying a designation out of a plurality of predefined designations of the respective wireless transceiver of the first plurality of wireless transceivers.

6. A method of wireless transceiver communications in a population of wireless transceivers, each wireless transceiver of the population including a two-way wireless communication device, having a transmitter and a first receiver, and a second receiver, wherein a first subset of wireless transceivers of the population are configured to share a first common designation, whereby each wireless transceiver of the first subset of wireless transceivers forms a node of a first common designation network, and wherein a second subset of wireless transceivers of the population are configured to share a second common designation different from the first common designation, whereby each wireless transceiver of the second subset of wireless transceivers forms a node of a second common designation network, the method comprising:

(a) by each respective wireless transceiver of the first subset of wireless transceivers,
  (i) powering down the two-way wireless communication device of such respective wireless transceiver to conserve energy,
  (ii) while the two-way wireless communication device is powered down,
    (A) screening radio frequency broadcasts for first criteria while drawing a first electric current,
    (B) if the first criteria is met in a radio frequency broadcast, then screening in such radio frequency broadcast for second criteria while drawing a second current that is at least an order of magnitude greater than the first current,
    (C) if the second criteria is met in a radio frequency broadcast, then screening in such radio frequency broadcast for specific data identifying the common designation of the first subset of wireless transceivers of the population, and
    (D) if the specific data identifying the common designation of the first subset of wireless transceivers of the population is found, then providing an internal wake-up signal to the two-way wireless communication device of the respective wireless transceiver; and
(iii) in response to receiving the internal wake-up signal at the two-way wireless communication device of the respective wireless transceiver,
(A) powering up the two-way wireless communication device of the respective wireless transceiver, and
(B) screening, by the two-way wireless communication device of the respective wireless transceiver, while powered up, radio frequency broadcasts for specific data identifying the common designation of the first subset of wireless transceivers of the population and processing the radio frequency broadcast if the specific data identifying the common designation of the first subset of wireless transceivers of the population is found therein by the two-way wireless communication device,
(iv) wherein the second receiver of the respective wireless transceiver is adapted to draw substantially less current while screening radio frequency broadcasts for specific data identifying a designation than the two-way wireless communication device of the respective wireless transceiver while screening radio frequency broadcasts for specific data identifying a designation; and (b) by each respective wireless transceiver of the second subset of wireless transceivers,
(i) powering down the two-way wireless communication device of such respective wireless transceiver to conserve energy,
(ii) while the two-way wireless communication device is powered down,
(A) screening radio frequency broadcasts for first criteria while drawing a first current,
(B) if the first criteria is met in a radio frequency broadcast, then screening in such radio frequency broadcast for second criteria while drawing a second current that is at least an order of magnitude greater than the first current,
(C) if the second criteria is met in a radio frequency broadcast, then screening in such radio frequency broadcast for specific data identifying the common designation of the second subset of wireless transceivers of the population, and
(D) if the specific data identifying the common designation of the second subset of wireless transceivers of the population is found, then providing an internal wake-up signal to the two-way wireless communication device of the respective wireless transceiver; and
(iii) in response to receiving the internal wake-up signal at the two-way wireless communication device of the respective wireless transceiver,
(A) powering up the two-way wireless communication device of the respective wireless transceiver, and
(B) screening, by the two-way wireless communication device of the respective wireless transceiver, while powered up, radio frequency broadcasts for specific data identifying the common designation of the second subset of wireless transceivers of the population and processing the radio frequency broadcast if the specific data identifying the common designation of the second subset of wireless transceivers of the population is found therein by the two-way wireless communication device,
(iv) wherein the second receiver of the respective wireless transceiver is adapted to draw substantially less current while screening radio frequency broadcasts for specific data identifying a designation than the two-way wireless communication device of the respective wireless transceiver while screening radio frequency broadcasts for specific data identifying a designation.

7. The method of claim 6, wherein a particular wireless transceiver of the first subset of the population is configured to include another common designation, and wherein the method further comprises the steps of, by the particular wireless transceiver of the first subset of wireless transceivers,
(a) screening a radio frequency broadcast for specific data identifying the other common designation when screening of the radio frequency broadcast by the particular wireless transceiver is found to meet the first and second criteria;
(b) if the specific data identifying the other common designation is found, then providing an internal wake-up signal to the two-way wireless communication device of the particular wireless transceiver; and
(c) in response to receiving the subsequent internal wake-up signal at the two-way wireless communication device of the particular wireless transceiver,
(i) powering up the two-way wireless communication device of the particular wireless transceiver, and
(ii) screening, by the two-way wireless communication device of the particular wireless transceiver, while powered up, radio frequency broadcasts for specific data identifying the other common designation and processing the radio frequency broadcast if the specific data identifying the other common designation of the particular wireless transceiver is found therein by the two-way wireless communication device.

8. The method of claim 6, wherein said step of processing a radio frequency broadcast, by the two-way wireless communication device of a respective wireless transceiver of the first subset of wireless transceivers, comprises communicating a message in response to the radio frequency broadcast.

9. The method of claim 6, wherein said step of processing a radio frequency broadcast, by the two-way wireless communication device of a respective wireless transceiver of the first subset of wireless transceivers, comprises forwarding a message of the radio frequency broadcast by the two-way wireless communication device of the respective wireless transceiver.

10. The method of claim 6, wherein the first current that is drawn while screening radio frequency broadcasts for first criteria by a particular wireless transceiver of the first subset is on the order of magnitude of tens of microamps of electric current, and wherein the second current that is drawn while screening radio frequency broadcasts for second criteria by the particular wireless transceiver of the first subset is on the order of magnitude of hundreds of microamps of electric current.

11. The method of claim 6, wherein the first current that is drawn while screening radio frequency broadcasts for first criteria by a particular wireless transceiver of the second subset is on the order of magnitude of tens of microamps of electric current, and wherein the second current that is drawn while screening radio frequency broadcasts for second criteria by the particular wireless transceiver of the second subset is on the order of magnitude of hundreds of microamps of electric current.

12. The method of claim 6, wherein screening of a radio frequency broadcast for second criteria comprises screening of the radio frequency broadcast for data.

13. The method of claim 6, wherein screening of a radio frequency broadcast for second criteria comprises screening in a preamble of the radio frequency broadcast for data.

14. The method of claim 6, wherein screening of a radio frequency broadcast for second criteria comprises screening in a payload of the radio frequency broadcast for data.

15. The method of claim 6, wherein screening of a radio frequency broadcast for second criteria comprises screening of the radio frequency broadcast for a message type of the radio frequency broadcast.

16. The method of claim 6, wherein screening, by the second receiver of each respective wireless transceiver of the first subset of wireless transceivers of the population, of a radio frequency broadcast for specific data identifying the common designation of the first subset of wireless transceivers of the population draws on the order of magnitude of a milliamp of electric current.

17. The method of claim 6, further comprising reading, by a wireless transceiver of the first subset of wireless transceivers, one or more sensor devices disposed externally thereto and in proximity thereof.

18. A system of wireless transceivers, comprising:
  (a) a first plurality of wireless transceivers, each respective wireless transceiver of the first plurality of wireless transceivers comprising:
    (i) a two-way wireless communication component configured to power down to conserve energy and configured to power up in response to an electronic signal, the two-way wireless communication component including a transmitter and a first receiver, and
    (ii) a second receiver that is configured to:
      (A) screen radio frequency broadcasts for first criteria, wherein the respective wireless transceiver of the first plurality of wireless transceivers draws a first electric current when screening for the first criteria,
      (B) for each broadcast in which the first criteria is met, screen such radio frequency broadcast for second criteria, wherein the respective wireless transceiver of the first plurality of wireless transceivers draws a second electric current when screening such radio frequency broadcast for the second criteria, the second electric current being larger than the first electric current, and
      (C) for each broadcast in which the second criteria is met, screen such radio frequency broadcast for specific data identifying a designation out of a plurality of predefined designations of the respective wireless transceiver of the first plurality of wireless transceivers, wherein the respective wireless transceiver of the first plurality of wireless transceivers draws a third electric current when screening such radio frequency broadcast for the specific data, the third electric current being an order of magnitude larger than the second electric current,
    (iii) wherein the two-way wireless communication component is configured to screen radio frequency broadcasts for specific data in each broadcast identifying a designation out of the plurality of predefined designations of the respective wireless transceiver of the first plurality of wireless transceivers, and
    (iv) wherein the second receiver is adapted to draw substantially less current while screening radio frequency broadcasts for specific data identifying a designation than the current that the two-way wireless communication component draws while screening radio frequency broadcasts for specific data identifying a designation;
  (b) a second plurality of wireless transceivers, each respective wireless transceiver of the second plurality of wireless transceivers comprising:
    (i) a two-way wireless communication component configured to power down to conserve energy and configured to power up in response to an electronic signal, the two-way wireless communication component including a transmitter and a first receiver, and
    (ii) a second receiver that is configured to:
      (A) screen radio frequency broadcasts for first criteria, wherein the respective wireless transceiver of the second plurality of wireless transceivers draws a first electric current when screening for the first criteria,
      (B) for each broadcast in which the first criteria is met, screen such radio frequency broadcast for second criteria, wherein the respective wireless transceiver of the second plurality of wireless transceivers draws a second electric current when screening such radio frequency broadcast for the second criteria, the second electric current being larger than the first electric current, and
      (C) for each broadcast in which the second criteria is met, screen such radio frequency broadcast for specific data identifying a designation out of a plurality of predefined designations of the respective wireless transceiver of the second plurality of wireless transceivers, wherein the respective wireless transceiver of the second plurality of wireless transceivers draws a third electric current when screening such radio frequency broadcast for the specific data, the third electric current being an order of magnitude larger than the second electric current,
    (iii) wherein the two-way wireless communication component is configured to screen radio frequency broadcasts for specific data in each broadcast identifying a designation out of the plurality of predefined designations of the respective wireless transceiver of the second plurality of wireless transceivers, and
    (iv) wherein the second receiver is adapted to draw substantially less current while screening radio frequency broadcasts for specific data identifying a designation than the current that the two-way wireless communication component draws while screening radio frequency broadcasts for specific data identifying a designation; and
  (c) a gateway configured to make radio frequency broadcasts,
    (i) wherein at least some of the radio frequency broadcasts made by the gateway include specific data identifying a designation out of the plurality of predefined designations of each respective wireless transceiver of the first plurality of wireless transceivers, whereby the gateway causes the first plurality of wireless transceivers to awaken and to communicate without awakening or communicating with the second plurality of wireless transceivers, and
    (ii) wherein at least some of the radio frequency broadcasts made by the gateway include specific data identifying a designation out of the plurality of predefined designations of each respective wireless transceiver of the second plurality of wireless transceivers, whereby the gateway causes the second plurality of wireless transceivers to awaken and to communicate without awakening or communicating with the first plurality of wireless transceivers.

19. The system of claim 18, wherein the second receiver of each transceiver of the first plurality of transceivers is configured to, for each broadcast in which the second criteria is met, screen such radio frequency broadcast for specific data identifying any designation of the plurality of predefined designations of that respective wireless transceiver.

20. The system of claim 18, wherein the first criteria is a particular frequency and the second criteria is a particular modulation type.

21. The system of claim 18, wherein the second criteria is specific data.

22. The system of claim 18, wherein the second receiver of each transceiver of the first plurality of transceivers is configured to, for each broadcast in which the second criteria is met, screen a preamble of such radio frequency broadcast for specific data identifying a designation out of a plurality of predefined designations of the respective wireless transceiver of the first plurality of wireless transceivers.

* * * * *

UNITED STATES PATENT AND TRADEMARK OFFICE
CERTIFICATE OF CORRECTION

PATENT NO.       : 7,650,135 B2                                  Page 1 of 1
APPLICATION NO. : 11/422321
DATED            : January 19, 2010
INVENTOR(S)      : Robert W. Twitchell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Twenty-third Day of November, 2010

David J. Kappos
*Director of the United States Patent and Trademark Office*